Figure 1:
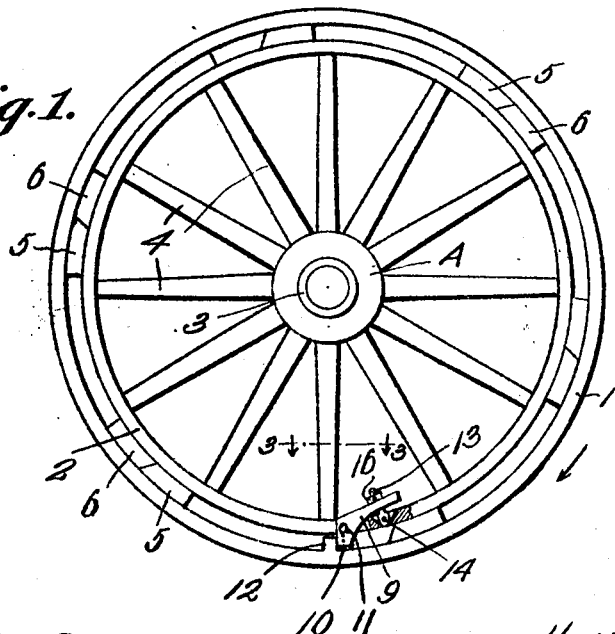

F. A. LANE.
RIM AND SECURING MEANS THEREFOR.
APPLICATION FILED APR. 9, 1918.

1,292,488.

Patented Jan. 28, 1919.

INVENTOR
Fred A. Lane,

WITNESSES
James F. Crown
W. Belrock

BY Richard Bowen,

ATTORNEY

UNITED STATES PATENT OFFICE.

FRED A. LANE, OF SHELBURN, INDIANA.

RIM AND SECURING MEANS THEREFOR.

1,292,488.　　　Specification of Letters Patent.　　Patented Jan. 28, 1919.

Application filed April 9, 1918. Serial No. 227,516.

*To all whom it may concern:*

Be it known that I, FRED A. LANE, a citizen of the United States, residing at Shelburn, in the county of Sullivan and State of Indiana, have invented certain new and useful Improvements in Rims and Securing Means Therefor, of which the following is a specification.

This invention relates to rims and securing means therefor, and more particularly to means for securing a rim upon an automobile wheel so as to be readily removed therefrom.

One of the main objects of the invention is to provide simple and efficient means wherein a rim may be readily secured on the wheel of an automobile so as to be easily demounted when required. A further object is to provide a rim having a plurality of locking blocks, these blocks coöperating with blocks secured on the felly of the wheel about which the rim is mounted to secure the rim against movement transversely of the felly. A further object is to provide simple and efficient means for moving the rim so as to bring the securing blocks therefor into operative engagement. Further objects will appear from the detailed description.

Figure 2:
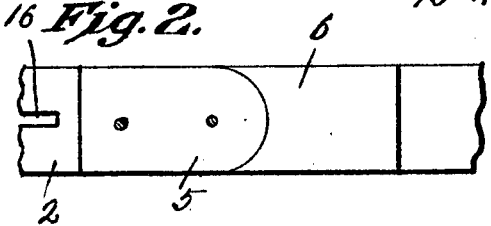
Figure 3:
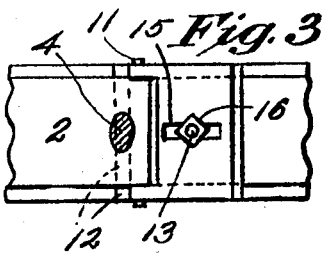
Figure 4:
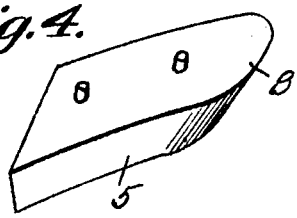
Figure 5:
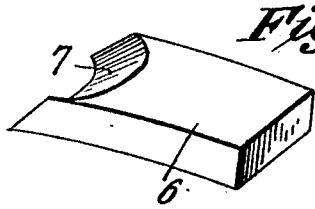

In the drawings:

Figure 1 is a side view of a rim and securing means therefor constructed in accordance with my invention as applied, Fig. 2 is a fragmentary top plan view of the securing means, Fig. 3 is a fragmentary section taken substantially on line 3—3 of Fig. 1, Fig. 4 is a perspective detail of one of the locking blocks carried by the rim, Fig. 5 is a perspective detail of one of the locking blocks carried by the felly.

The rim 1 may be of any suitable or standard construction and is adapted to be mounted in concentric spaced relation to the felly 2 of the wheel A having a hub 3 and radiating spokes 4 which connect the hub and felly.

Rim 1 is provided, on its inner face, with a plurality of spaced locking blocks 5 which are rigidly secured to the rim. These blocks are adapted to coöperate with locking blocks 6 which are secured on the outer face of the felly. Blocks 6 are provided in one end, with arcuate recesses 7 which taper inwardly toward the felly. These recesses are adapted to receive the arcuate tapering end portions 8 of the blocks 5. By moving rim 1 in the direction indicated by the arrow in Fig. 1 of the drawings, blocks 5 are forced into the recesses 7 of blocks 6 and coöperate therewith to effectually prevent movement of the rim transversely of the felly. Also, due to the taper of the recesses 7, and the coöperating end portions 8 of blocks 5, when blocks 5 are forced into the recesses of blocks 6, radial pressure will be exerted on the rim so as to properly brace and support the same and prevent all looseness or play between the rim and felly. In this manner, the rim may be readily secured on the felly in such manner so as to be easily removed therefrom. It will be understood, of course, that the blocks 5 of the rim correspond in spacing to the blocks 6 of the felly, and the blocks are so spaced as to permit proper rotary movement of the rim about the wheel so as to move blocks 5 into or out of operative position.

An operating lever 9 is pivotally secured on felly 2 by means of a pin 10 inserted through the felly and the depending arms 11 of the head of this lever. These arms are positioned closely adjacent the lateral faces of the felly and are adapted to engage a pressure block 12 which is secured to the inner face of rim 1. An adjusting screw 13 is swiveled in the felly 2 by a pin 14 inserted through the felly and screw. This screw projects through a central longitudinal slot 15 in the lever 10 and receives a pressure nut 16 threaded thereon above the lever. By turning nut 16 onto the screw, pressure may be exerted on the lever, this pressure being transmitted to block 12 by means of the depending arms 11. This results in forcing the rim 1 about the wheel in the direction indicated so as to bring blocks 5 into operative engagement with blocks 6 and secure the rim in proper position on the wheel in the manner previously described. By turning nut 16 off of screw 13, lever 9 may be swung inwardly into such position as to extend substantially radially of the wheel thus permitting the block 12 to pass beneath arms 11 of this lever. By turning nut 16 off of screw 13, lever 9 may be swung inwardly into such position as to extend substantially radially of the wheel thus permitting the block 12 to pass beneath arms 11 of this lever. By turning the rim 1 in a reverse direction, the blocks 5 may be moved into such position as to clear the blocks 6, thus permitting the rim to be readily removed by being moved transversely of the felly. In this manner, the rim may be readily removed or secured on the wheel. When in operative position, the rim is effectually locked against accidental displacement by means of lever 9 and the coöperating blocks 5 and 6 in the manner previously described.

Any suitable tire of standard construction may be used with rim 1. To accommodate the valve tube of the tire, I provide a slot 16' through the felly 2. This slot is of such length as to permit proper movement of the rim 1 in either direction about the felly for the purpose above set forth. The blocks 5 and 6, as well as the lever 9, may be readily applied to any rim and wheel of standard construction without necessitating any change therein.

The foregoing description and the drawings have reference to what may be considered the preferred, or approved, form of invention. It is to be understood that I may make such changes in construction and arrangement and combination of parts, materials, dimensions, etc., as may prove expedient and fall within the scope of the appended claim.

Having thus fully described my invention what I claim as new and desire to secure by Letters Patent is:

In a rim and securing means therefor, a felly, a plurality of locking blocks secured on the outer face of the felly each provided at one end with an arcuate tapering recess, a rim mounted concentric with said felly, locking blocks secured on the inner face of said rim and each having one end corresponding in shape to the recesses in the blocks carried by the felly, a pressure block secured on the inner face of the rim, a lever mounted on the felly for movement about an axis extending transversely thereof and provided with outwardly projecting arms adapted to engage said pressure blocks so as to move the rim in such direction as to bring the blocks carried thereby into operative engagement with the blocks carried by the felly when the lever is moved toward the felly, and means for forcing said lever toward the felly and for securing it in depressed position.

In testimony whereof I affix my signature in presence of two witnesses.

FRED A. LANE.

Witnesses:
 OSCAR B. SARGENT,
 JAMES H. UNDERHILL.